United States Patent Office 2,834,792
Patented May 13, 1958

2,834,792
ADDITION PRODUCTS OF 1-ACYLOXY-3-BUTEN-2-ONES

Joseph M. Wilkinson, Jr., and Edgar E. Renfrew, Jr., Easton, Pa., assignors to General Aniline & Film Corporation, New York, N. Y., a corporation of Delaware No Drawing. Application December 31, 1952
Serial No. 329,105

7 Claims. (Cl. 260—376)

The present invention relates to the addition products of 1-acyloxy-3-buten-2-ones with compounds containing an active hydrogen atom, and to their process of manufacture.

Despite the marked propensity of 1-acyloxy-3-buten-2-ones to polymerize, particularly the lower acyloxy homologs, we have discovered that these ketones may be added to compounds containing an active hydrogen atom to yield novel addition products. When the active hydrogen-containing compound is a primary or secondary aminoanthraquinone in which the amino group or groups are attached to a nuclear carbon atom, the addition products are dyestuffs or dyestuff intermemiates which have the ability of dyeing acetate rayon, wool, silk or synthetic polymer fibers such as nylon, Orlon, Dacron, Acrilan and the like in brilliant shades deeper in color than those produced by the aminoanthraquinones from which the addition products are derived. In addition, such novel products have good substantivity for the fiber and are generally much faster to light and washing.

The addition products of 1-acyloxy-3-buten-2-ones with other active hydrogen-containing compounds have utility as plasticizers, antioxidants, solvents, intermediates for pharmaceuticals, perfumes, dyestuffs and the like, modifiers for vat and azo dyes, non-diffusing reactants for color formers, etc.

It is, accordingly, an object of the present invention to provide a process for producing addition products of 1-acyloxy-3-buten-2-ones with compounds containing an active hydrogen atom.

A further object of the present invention is the products produced by such process.

A still further object of the present invention is the production of addition products of anthraquinoneamines and 1-acyloxy-3-buten-2-ones.

Other and further objects of the invention will become apparent as the description proceeds.

The addition reaction to which the instant invention is directed proceeds in accordance with the following formula:

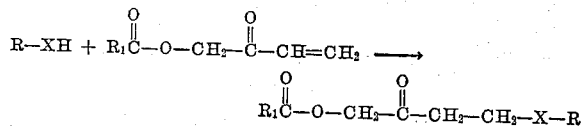

in which R is selected from the group consisting of H, alkyl, cycloalkyl, aryl and heterocyclic, X is selected from the group consisting of —O—, —S—, and —NR$_2$—, R$_1$ is alkyl, and R$_2$ is selected from the group consisting of H, alkyl, cycloalkyl, aryl, heterocyclic, and part of a cycle when taken together with R. Compounds containing a plurality of —XH groups may react to give the corresponding polyaddition products.

The 1-acyloxy-3-buten-2-ones operative in the above set forth reaction, and their methods of production are disclosed in U. S. Patent No. 2,524,025 and in the copending application of J. M. Wilkinson, Serial No. 271,065, filed February 11, 1952. While the preferred acyl group in the ketone is that derived from acetic acid, the acyl group may be derived from other acids including propionic, butyric, isobutyric, valeric, caprylic, capric, lauric, myristic, palmitic, stearic acids and the like. In general, acyl groups derived from the lower fatty acids of less than 6 carbon atoms are preferred.

As compounds containing active hydrogen atoms operative in the instant invention may be mentioned in general, ammonia, primary alkyl-, aryl- and heteroamines, secondary alkyl- and alkylarylamines, water, phenols, aliphatic alcohols, hydrogen sulfide, thiophenols, and aliphatic mercaptans. Within these broad groups, the following compounds are mentioned by way of example only as operative in the instant invention:

1,4-diamino anthraquinone
1,4-diamino-2-methoxy anthraquinone
1-amino anthraquinone
2-amino anthraquinone
1-(p-acetamido anilino)-4-amino anthraquinone
1-(p-[N - methylacetamido]anilino) - 4 - aminoanthraquinone
1-amino-2-hydroxy anthraquinone
1-amino-4-benzoylamino anthraquinone
1-amino-4-chloro anthraquinone
1-amino-2-nitro anthraquinone
1-amino-4-nitro anthraquinone
1-amino-2-carboxy-4-nitro anthraquinone
1-nitro-2-amino anthraquinone
2-amino-3-carboxy anthraquinone
1-amino-2-methyl-4-nitro anthraquinone
1,4-diamino-2-carboxy anthraquinone
1-amino-4-hydroxy-6-sulfo anthraquinone
1-amino-4-hydroxy anthraquinone
1,4-diamino-5-nitro anthraquinone
1,4-diamino-3-methoxy anthraquinone
1-amino-4-methylamino anthraquinone
1-amino-4-acetylamino anthraquinone
1-amino-5-chloro anthraquinone
1,5-diamino-2,4,6,8-tetrachloro anthraquinone
1,2-diamino anthraquinone
1,5-diamino anthraquinone
1,8-diamino anthraquinone
1-amino-5-benzoylamino anthraquinone
1-amino-5-chloro anthraquinone
1,2,4-triamino anthraquinone
1,4,5,8-tetra-amino anthraquinone
1-amino-4-ethanolamino anthraquinone
1-anilino-4-amino anthraquinone
1-benzylamino-4-amino anthraquinone
4,5-diaminochrysazine
4,8-diaminoanthrarufin
5,8-diaminoquinizarin
Methylamine
Diethylamine
Butylamine
Diisopropylamine
Piperidine
Ethylenediamine
Cyclohexylamine
Aniline
o-Toluidine
N-ethyl aniline
N-methyl-m-toluidine
N-methyl-o-toluidine
o-Chloroaniline
Benzylamine
o-Anisidine
m-Bromoaniline
m-Iodoaniline
o-Nitroaniline
2,4,6-trichloroaniline 2-aminopyridine
2-aminobiphenyl
α- and β-Naphthylamine
Piperazine
m-Aminophenol
p-Phenylenediamine
Cumidine
Octylamine
Octadecylamine
2-aminoquinoline
Indole
Carbazole
m-Aminoacetanilide
Phenyl mercaptan
Benzyl mercaptan
p-Tolyl mercaptan
α-Phenyl ethyl mercaptan
Biphenyl mercaptan
Methyl mercaptan
Ethyl mercaptan
Propyl mercaptan
Hexyl mercaptan
Octyl mercaptan
Nonyl mercaptan
Thienyl mercaptan
Cetyl mercaptan
Hydroquinone monomethyl ether
Phenol
o-, m-, and p-Cresol
Xylenols
Hydroquinone
Resorcinol
o-, m-, p-Chlorophenol
Salicylic acid
o-, m-, p-Nitrophenol
o-, m-, and p-Hydroxybenzene sulfonic acids
8-hydroxy quinoline
p-Phenylphenol
α- and β-Naphthol
Methanol
Ethanol
Propanol
Octanol
Octadecenol
Ethylene glycol
Ethylene chlorohydrin
Tetrahydrofurfuryl alcohol
Cyclohexanol
2-nitroethanol
1,4-butanediol
1,6-hexanediol
2-methoxyethanol
Polyethylene glycol (Carbowax)
Monoethyl ether of diethylene glycol (ethyl carbitol)
Cinnamyl alcohol
Benzyl alcohol
β-Phenylethanol
Geraniol
α-Terpineol
Sorbitol
Mannitol
Penetaerythritol
and the like.

It will of course be understood that inert substituents which do not affect the progress of the desired reaction or the desired properties in the final product may be present in either of the reactants employed in the process of this invention.

The addition reaction of the instant invention is carried out at temperatures readily determinable by a worker skilled in the art, for example at from about 15 to 210° C., but preferably at elevated temperatures ranging from about 75 to 130° C., if desired in the presence of a solvent and a small amount of a catalyst, for a time sufficient to complete the addition reaction. In any particular instance, if a solvent is desirable because of the nature of the reactants, or the like, one may be employed which does not contain a hydrogen atom more active than that of the active-hydrogen containing reactant. In other words, it must be inert. Thus, when employing an aminoanthraquinone as reactant, there may be used as solvent water, organic acids, alcohols, ketones, ethers, esters, hydrocarbons, halohydrocarbons, and the like, but not amines, anilines or the like. In many cases a solvent may be used which at the same time acts as a catalyst, as for example glacial acetic acid.

The amount of ketone employed is almost always in substantial excess of the amount theoretically necessary to react with the active-hydrogen containing compound present in the reaction mixture. This compensates for any previous polymerization of the ketone which might have occurred thereby reducing the amount of ketone available for the desired reaction, and also assists in driving the reaction to completion.

When the compound containing the active hydrogen atom is a primary anthraquinonylamine, a test with boric acid-acetic anhydride reagent may be employed in some cases to determine whether the desired addition reaction has been completed. Other appropriate tests may be used. Frequently a color change indicates that the desired reaction has occurred. Upon completion of the reaction, the desired addition product is isolated as, for example, by diluting in water and filtering, or cooling the mixture to crystallize the product, or other techniques.

The invention is illustrated by the following examples, in which the parts are by weight unless otherwise indicated. It is to be understood that these examples are illustrative only.

*Example 1*

A solution of 39 parts of 1,4-butyne-diol in 90 parts of glacial acetic acid is refluxed gently for three hours. The mixture is cooled to room temperature, whereupon 3 parts of mercuric sulfate is added. The reaction mixture is warmed cautiously until the exothermic rearrangement sets in, usually at a temperature of 45 to 50° C. By means of an external ice bath, the temperature is maintained in this range until there is no further tendency for it to rise spontaneously. This mixture containing 1-acetoxy-3-buten-2-one may be employed immediately for the addition reaction of this invention.

*Example 2*

The mixture containing the 1-acetoxy-3-buten-2-one as produced in Example 1 is warmed to 85° C. and 11.9 parts of 1,4-diamino anthraquinone added thereto. The violet mixture immediately turns blue. It is maintained at 85–90° C. for 1 hour and at 95–100° C. for an additional ½ hour. The mercuric sulfate is removed by filtration and the filtrate is poured into 1500 parts of water. The precipitate is isolated by decantation and filtration and is then dried at 80° C. The product which is largely 1,4 - bis(4 - acetoxy-3-oxobutylamino)anthraquinone dyes acetate rayon in brilliant blue shades of especially good fastness properties to washing and light.

*Example 3*

A solution of 11.9 parts of 1,4-diamino anthraquinone in 150 parts of acetic acid is heated to 85–90° C. 19.2 parts of 1-acetoxy-3-butene-2-one (obtained as above and isolated) are added over a period of 10 minutes. The reaction mixture becomes blue immediately upon the addition of the ketone. After 2½ hours at 95–100° C. there is no evidence of unreacted primary amine as shown by the boric acid-acetic anhydride reagent. 250 parts of water are added dropwise to the solution and the resulting mixture poured into 1000 parts of water. The mixture is then filtered to remove the precipitate which is formed, and the filter cake is washed well with water and dried at 80° C. A product of the same formula and properties as that of Example 2 is thus obtained.

Example 4

13.4 parts of 1,4-diamino-2-methoxyanthraquinone are placed in 150 parts of glacial acetic acid. At 90° C. 19.2 parts of 1-acetoxy-3-buten-2-one as produced in Example 1 are added over a period of 10 minutes. The reaction mixture is maintained at 100 to 110° C. for 4 hours. The product is isolated by the same procedure as that described in Example 2. It dyes cellulose acetate fibers clear violet shades of excellent properties. The product is 1-amino-2-methoxy-4-(4-acetoxy-3-oxobutylamino)-anthraquinone.

Example 5

39 parts of 1,4-butynediol is dissolved in 90 parts of acetic acid and the solution is refluxed for 4 hours. The reaction mixture is cooled to room temperature. 3 parts of mercuric sulfate are added and the rearrangement to 1-acetoxy-3-buten-2-one is conducted as described in Example 1.

After completion of the rearrangement and removal of the catalyst by filtration, there are added portionwise 22.3 parts of 1-aminoanthraquinone. The reaction mixture changes rapidly from the original golden yellow to scarlet. The product, which is isolated by the method described above, dyes acetate rayon in brilliant scarlet shades of good properties.

Example 6

The procedure is the same as in Example 5, excepting that 2-amino-anthraquinone is used in place of 1-aminoanthraquinone. The resulting product dyes acetate rayon, golden-orange shades.

Example 7

To 3 parts of 1,4-diamino-anthraquinone-2-sulfonic acid in 70 parts of water is added a solution of 7.5 parts of 1-acetoxy-3-buten-2-one in 7.5 parts of acetic acid. The reaction mixture is heated to the reflux temperature. It changes rapidly from its original violet shade to a deep blue. The resulting product is isolated as above. It dyes wool rich blue shades of especially good leveling properties.

Example 8

8.6 parts of 1,4-butynediol and 90 parts of glacial acetic acid are refluxed for 3 hours. The reaction mixture is cooled and 1 part of mercuric sulfate is added cautiously. The reaction mixture is warmed until the exothermic reaction sets in, the temperature being controlled with external cooling. When there is no further tendency for the temperature to rise spontaneously, there is added another 1 part portion of mercuric sulfate. The temperature is maintained briefly at 80° C. Then are added 18.6 parts of 1-(p-acetamidoanilino)-4-amino-anthraquinone. The reaction mixture is maintained at 90° C. until the boric acid-acetic anhydride reagent shows no unreacted primary amine remaining. The reaction product is isolated as above. It is 1-(p-acetamidoanilino)-4-(4-acetoxy-3-oxobutylamino)-anthraquinone. Acetate rayon is dyed by it in attractive greenish-blue shades of good fastness properties, especially to light and washing.

Example 9

1-acetoxy-3-buten-2-one reacted readily with thiophenol to give the expected addition product as indicated by the following equation:

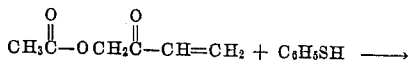

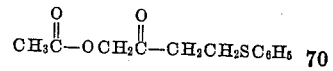

A mixture of 5.0 g. 1-acetoxy-3-buten-2-one and 3.0 g. thiophenol was heated to 100°–120° C. for a few minutes. The mixture became thick and crystallized on cooling in an ice-bath. Crystallization from dilute ethanol (50%) gave white needles, M. P. 37.5° C.

*Analysis.*—Calcd. for $C_{12}H_{14}O_3S$: C, 60.5; H, 5.9; S, 13.45. Found: C, 60.8; H, 5.72; S, 13.21.

Example 10

1-acetoxy-3-buten-2-one reacted readily with aniline to give the anticipated adduct as indicated by the following equation:

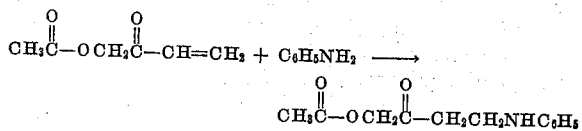

To a mixture of 5.0 g. 1-acetoxy-3-buten-2-one and 5.0 g. aniline was added about 1 drop of conc. HCl. The reaction was spontaneous and the temperature rose to 80° C. After a few minutes, the reaction mixture was cooled and diluted with about 10 cc. water containing about 1 cc. conc. HCl. The mixture was cooled in an ice-bath and white crystals separated. Crystallization from a mixture of ether and petroleum ether (B. P. 35°–85° C.) gave white needles, M. P. 38° C.

*Analysis.*—Calcd. for $C_{12}H_{15}NO_3$: C, 65.13; H, 6.77; N, 6.33. Found: C, 65.08; H, 6.68; N, 6.33.

Example 11

1-acetoxy-3-buten-2-one reacted readily with phenol to give the expected addition product as indicated by the following equation:

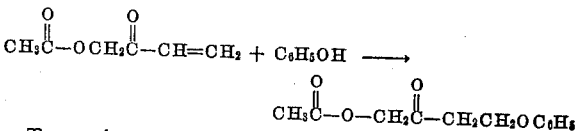

To a mixture of 5 g. 1-acetoxy-3-buten-2-one and 5 g. phenol was added about 1 drop conc. HCl. The mixture was heated for a few minutes at 80°–85° C. The mixture was cooled; diluted with about 10 ml. water; and neutralized with the requisite quantity of 20% NaOH. The mixture was cooled in an ice-bath and white crystals separated. Crystallization from dilute ethanol (50%) gave white needles, M. P. 80° C.

Example 12

1-acetoxy-3-buten-2-one reacted readily with dioctylamine to give the anticipated adduct as indicated by the following equation:

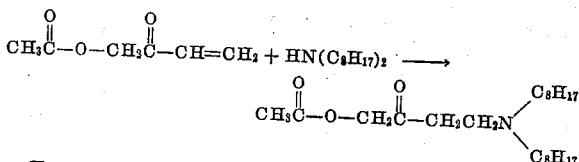

To a mixture of 5 g. 1-acetoxy-3-buten-2-one and 9.5 g. dioctylamine was added about 1 drop conc. HCl. The reaction was spontaneous and the temperature rose to 95° C. After a few minutes, the reaction was cooled and diluted with about 10 cc. water containing about 2 cc. conc. HCl. The adduct was a colorless, viscous oil which did not crystallize.

Various modifications and variations of this invention will be obvious to a person skilled in the art and such variations and modifications are to be regarded as within the purview of this application and the spirit and scope of the appended claims.

We claim:

1. A compound of the formula

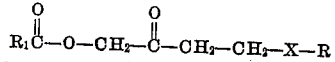

in which $R_1$ is alkyl, X is NH, and R is aryl.

2. A compound of the formula

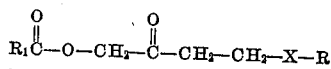

in which $R_1$ is alkyl, X is NH, and R is anthraquinonyl.

3. A compound of the formula
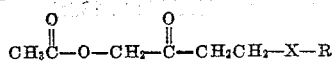
in which X is NH and R is anthraquinonyl.
4. 1,4-bis(4-acetoxy-3-oxobutylamino)-anthraquinone.
5. 1 - (p - acetamidoanilino) - 4 - (4 - acetoxy - 3 - oxobutylamino)-anthraquinone.
6. 2 - methoxy - 1,4 - bis(4 - acetoxy - 3 - oxobutylamino)-anthraquinone.
7. A compound of the formula
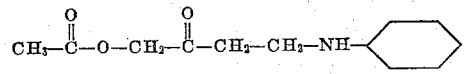
References Cited in the file of this patent
UNITED STATES PATENTS
| | | |
|---|---|---|
| 2,152,480 | Hopff et al. | Mar. 28, 1939 |
| 2,304,889 | Dickey et al. | Dec. 15, 1942 |
| 2,374,283 | Grun et al. | Apr. 24, 1945 |